UNITED STATES PATENT OFFICE.

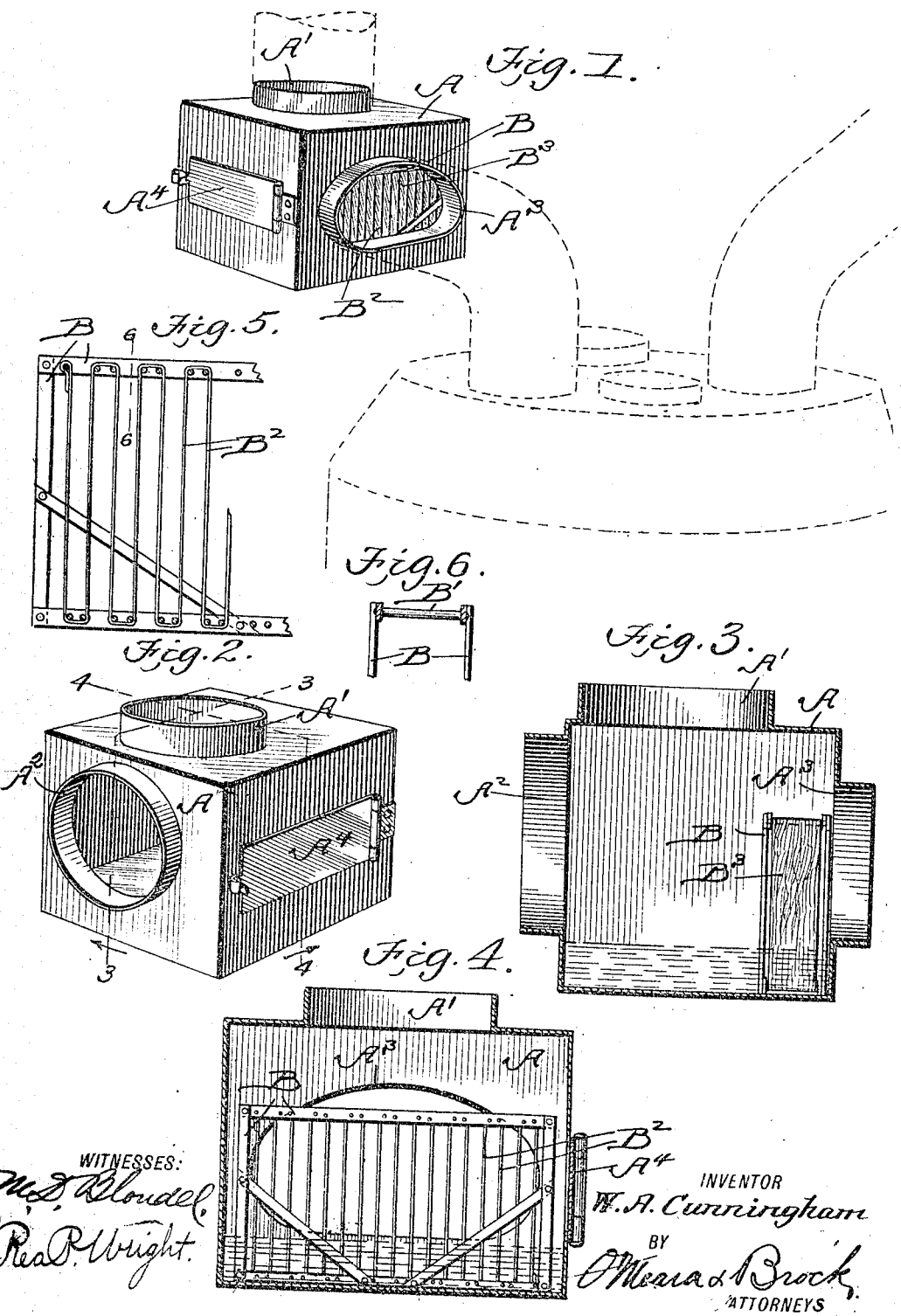

WILLIAM A. CUNNINGHAM, OF WINONA, MINNESOTA.

AIR-MOISTENER FOR FURNACES.

No. 872,330.

Specification of Letters Patent.

Patented Dec. 3, 1907.

Application filed November 10, 1905. Serial No. 286,754.

*To all whom it may concern:*

Be it known that I, WILLIAM A. CUNNINGHAM, a citizen of the United States, residing at Winona, in the county of Winona and State of Minnesota, have invented a new and useful Air-Moistener for Furnaces, of which the following is a specification.

My invention relates to certain new and useful improvements in air moisteners for furnaces and has for its object to provide a moistener that is very simple and cheap in construction and one that can be attached to any furnace.

Another object of my invention is to provide a moistener that is especially constructed so that it can be attached to the hot air pipe leading from the furnace so that the hot air will be moistened while passing through to the room.

A further object of the invention is to provide a box adapted to be attached to the hot air pipe of a furnace provided with a frame arranged in the box carrying linen strips which are adapted to be kept moist by the water in the box.

With these objects in view, the invention consists of the novel features of construction, combination and arrangement of parts, hereinafter fully described and pointed out in the claims.

In the drawings forming a part of this specification:—Figure 1 is a perspective view of the moistener attached to the pipe. Fig. 2 is a perspective view of the moistener removed. Fig. 3 is a sectional view on the line 3—3 of Fig. 2. Fig. 4 is a sectional view taken on the line 4—4 of Fig. 2. Fig. 5 is a detail view of the frame. Fig. 6 is a section taken on the line 6—6 of Fig. 5.

Referring to the drawings, A, indicates the square metal box forming the body of the moistener, which is provided with a flanged opening $A'$, on its top and flanged openings $A^2$, and $A^3$, on its two opposite sides, by means of which the hot air pipes are connected. The opening $A^3$, is formed oval and is adapted to be connected to the pipe leading from the furnace. The box is also provided with an opening on one of its sides provided with a hinged door $A^4$, by means of which water can be placed in the box. Arranged in the box, near the opening $A^3$, are duplicate frames B, spaced apart by the bar $B'$, and having wires $B^2$, stretched across from top to bottom forming a back upon which the strips of linen $B^3$, are adapted to be secured, so that they will be held firmly in front of the hot air pipe leading from the furnace.

From the foregoing description, it will be seen that I have provided a moistener that can be attached to any hot air pipe and one that will be very effective in use.

In operation water is placed in the box and the linen will become saturated by capillary attraction and as the hot air from the furnace strikes the damp cloth, the air will be moistened before it passes into the pipes leading into the rooms.

Having thus fully described my invention, what I claim as new and desire to secure by Letters Patent is:—

In a moistener for hot air furnaces, the combination with a box provided with flanged openings, adapted to contain water, one of said openings adapted to be connected to the hot air pipe leading from the furnace, the other openings being connected to hot air pipes leading to the rooms, duplicate frames arranged in said box, spaced apart by bars having wires stretched across from top to bottom forming backs, said frames being arranged in front of the opening connected to the pipe leading to the furnace, and strips of linen arranged over said frames and wires, and secured thereto, for the purpose set forth.

WILLIAM A. CUNNINGHAM.

Witnesses:
GEO. BAUMGARTNER,
R. M. CLEMENT.